United States Patent [19]

Fidi

[11] Patent Number: 4,955,578

[45] Date of Patent: Sep. 11, 1990

[54] RESILIENTLY FASTENED SUPPORT DEVICE FOR A MICROPHONE

[75] Inventor: Werner Fidi, Baden, Austria

[73] Assignee: AKG Akustische u. Kino-Gerate Gesellschaft m.b.H., Vienna, Austria

[21] Appl. No.: 337,737

[22] Filed: Apr. 13, 1989

[30] Foreign Application Priority Data

Apr. 13, 1988 [AT] Austria .................................. 957/88

[51] Int. Cl.[5] ............................................ F16M 13/00

[52] U.S. Cl. .................................... 248/559; 188/380; 248/611; 248/618; 381/169

[58] Field of Search ............... 248/559, 568, 581, 611, 248/618, 638, 317, DIG. 10; 381/169, 188, 205, 189; 188/380; 267/136

[56] References Cited

U.S. PATENT DOCUMENTS

| | | | |
|---|---|---|---|
| 2,901,552 | 8/1959 | Geloso | 381/205 X |
| 3,153,123 | 10/1964 | Harman | 381/158 |
| 3,735,952 | 5/1973 | Platus et al. | 188/380 X |
| 3,780,207 | 12/1973 | Crosby et al. | 188/380 X |
| 4,546,950 | 10/1985 | Cech | 248/610 |
| 4,550,812 | 11/1985 | Mard | 267/136 X |
| 4,694,650 | 9/1987 | Vicent | 188/380 X |

FOREIGN PATENT DOCUMENTS

| | | | |
|---|---|---|---|
| 0067371 | 4/1972 | Austria . | |
| 2052443 | 3/1973 | Fed. Rep. of Germany . | |
| 3125040 | 3/1983 | Fed. Rep. of Germany | 248/559 |

*Primary Examiner*—Ramon O. Ramirez
*Attorney, Agent, or Firm*—Toren, McGeady & Associates

[57] ABSTRACT

A resiliently fastened support device for supporting an arrangement carrying a microphone, such as, a tripod tube, a gooseneck, a plug-type connection or the like. The support device is connected to an end of the arrangement which faces away from the microphone. The support device is connected to an end of the arrangement which faces away from the microphone. The mass of the support device is a multiple of the mass of the microphone and the arrangement carrying the microphone.

10 Claims, 3 Drawing Sheets

Fig. 3
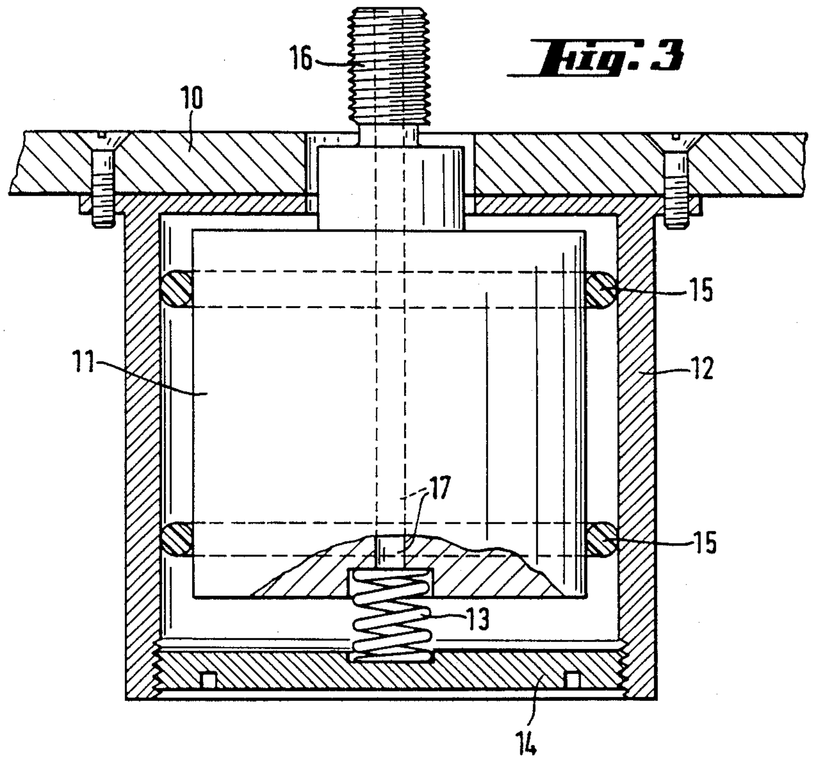
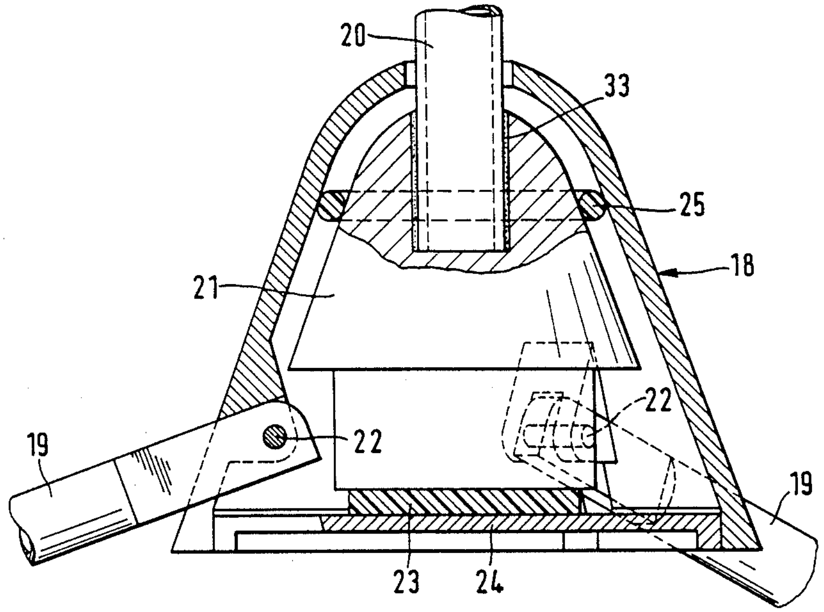
Fig. 4

RESILIENTLY FASTENED SUPPORT DEVICE FOR A MICROPHONE

BACKGROUND OF THE INVENTION

1. Field of the Invention

The present invention relates to a resiliently fastened support device for a microphone. More specifically, the invention relates to a support device for supporting an arrangement carrying the microphone, such as, a tripod tube, a gooseneck, a plug-type connection or the like. The support device is connected to an end of the arrangement which faces away from the microphone.

2. Description of the Related Art

Austrian patent application A 673/71 discloses a vibration-damped microphone and/or tripod whose vertical tripod tube is connected through a connecting piece to support legs, wherein the support legs are each resiliently mounted with one end in the connecting piece and each support leg has at the other end a resilient rubber boot which rests on the floor. The microphone tripod according to the Austrian patent application does avoid the transmission of impact sound to the microphone. However, the tripod requires a vibration system which is coupled together through springs and masses, wherein acceptable damping values are only obtained if the masses and the resiliencies are in a certain relationship with each other. A microphone tripod of this type has the disadvantage that it is of complicated construction and that particularly elastic materials must be used for the elastic resilient points of the tripod in order to meet the mass and resiliency conditions necessary for an acceptable damping.

Another possibility of fastening a microphone to a tripod, to a table leg or to a support arrangement is disclosed in German Auslegeschrift 20 52 443. The resilient fastening arrangement of this reference includes a spring part of three or more flat, elongated springs which are fastened to a rigid part and to a movable part at fastening points or areas, wherein the fastening points of the rigid part and of the part to be resiliently mounted are mounted in a respective fastening plane, wherein these fastening planes have the same or almost the same distance from the plane of the diaphragm. This type of fastening is very space-saving and can be constructed in such a way that it does not exceed the diameter of the part to be resiliently mounted. However, the spring proper may not be constructed with too much resiliency because it would then not be possible to avoid wobbling movements of the movable part. Consequently, the natural resonance determined by the resilient mass and the spring resiliency cannot be selected as low as may be desired and the actual damping of the electroacoustic transducer in electroacoustic transducer in the microphone against mechanical vibration is only insufficiently effective in the range of the natural resonance.

U.S. Pat. No. 3,153,123 discloses a table stand for a microphone which prevents the transmission of mechanical vibrations to the microphone by means of a vibration-damping device. The part carrying the microphone is constructed as a piston-type member which has a plurality of grooves in which 0-rings are placed, so that the piston can carry out a damped movement in the direction of its axis within a cylinder. This means that vibrations emanating from the base underneath the stand can only be kept away from the microphone to the extent as the absorption capability of the material of the 0-rings eliminates such a vibration transmission. Experience has shown that absorption values for mechanical vibrations of approximately 15 dB are obtained.

It is, therefore, the primary object of the present invention to provide with simple means the resiliently fastened support device for a microphone which makes it possible to obtain satisfactory values for an effective mechanical vibration insulation, wherein it is possible to fix any desired low frequency above which a mechanical vibration transmission to the microphone can no longer be perceived. The resiliency of the resilient fastening is not to be the exclusive factor for determining the frequency.

SUMMARY OF THE INVENTION

In accordance with the present invention, the mass of the support device is a multiple of the mass of the microphone and the arrangement carrying the microphone.

As a result of the structural arrangement according to the present invention, the spring which is used to fasten the support device is no longer dependent on the resiliently mounted part of the entire arrangement. In addition, the resiliently or the spring constant of the spring used does not have to be determined in accordance with the total mass of the resiliency mounted part, so that the mechanical vibration damping is fully effective above a certain frequency. On the contrary, the resilient mounting or support of the support device can be constructed in such a way as best possible under the conditions resulting for each individual special case of application.

The spring characteristic preferably is progressive, so that great excitation forces acting on the resiliently fastened system prevent large vibration amplitudes and a self-limitation of the deflection is effected without mechanical stops. Since the microphone mounted on the carrying arrangement is in the range of the natural resonance of the electroacoustic transducer the most sensitive with respect to the influence of mechanical vibrations, the natural resonance of the resiliently fastened support device for the microphone carrying arrangement will be made to be at least three octaves lower, so that harmful vibrations which act on the electroacoustic transducer do not any longer occur at the output of the microphone as an electrical spurious signal.

It is easily possible to provide the support device for the tripod tube, the gooseneck, the plug-type connection or the like with such a heavy mass that the resonant frequency of the entire system which includes the mass of the microphone is sufficiently low below the natural resonance of the transducer. Impacts which act on the resiliently fastened system which is capable of vibrating no longer has a harmful influence on the microphone. Since such a support device may be of very simple construction, the support device according to the invention also provides an economical advantage. For example, the springs on which the support device is fastened can be made as inexpensive rubber parts, or it may be possible to provide only a single elastic part of rubber sponge.

An advantageous development of the present invention provides that the mass of the support device is arranged underneath a base plate, for example, the plate of a lectern, a table, a switchboard or the like. This arrangement makes it possible that the arrangement carrying the microphone, for example, the tripod tube, the gooseneck or the plug-type connection, extends through a bore in the base plate, so that the part to be resiliently fastened is arranged underneath the base plate and is not visible. Thus, the shape of the support device does not have any influence on the configuration of the place where it is mounted. Due to the resilient fastening of the support device, the microphone is not affected by impacts acting on the base plate as they occur in holding a speech, working on a table or manipulating a switching apparatus. The support device may have any shape as the space available underneath the base plate allows. A cylindrical shape of the support device has been found particularly useful.

In accordance with another development of the invention, the mass of the support device is arranged within the base part of a microphone tripod. Microphone tripods are generally foldable, wherein the telescopic tube and the tripod legs are all fastened in a bell-shaped base part. This base part is particularly suitable for receiving the resiliently mounted support device without having to substantially increase the size of the base part. The shape of the mass for the support device is advantageously adjusted to the shape of the interior of the base part. For example, in the simplest case, the shape of a truncated cone is selected which can be rounded off to be adapted to the shape of a bell. A microphone tripod constructed in this manner is particularly suitable to keep impact sound of the floor on which the tripod is mounted away from the microphone.

In accordance with another advantageous development of the support device according to the present invention, the mass of the support device is arranged within the leg of a microphone table stand. Microphones are very frequently mounted on table stands because the use of the microphone is then not limited to a single speaking location. Table stands are particularly used when several speakers on a common table have to use one microphone, or when a single microphone is to be used for different applications. A particularly good insulation with respect to impact sound is mounted on such a table stand. The resiliently fastened mass is advantageously mounted in the base of the table stand. Also in this case, the shape of the mass can be adjusted to the dimensions of the interior of the table stand base.

The various features of novelty which characterize the invention are pointed out with particularity in the claims annexed to and forming a part of this disclosure. For a better understanding of the invention, its operating advantages attained by its use, reference should be had to the drawings and descriptive matter in which there are illustrated and described preferred embodiments of the invention.

BRIEF DESCRIPTION OF THE DRAWING

In the drawing:

FIG. 3 is a schematic view of an embodiment of the invention in which the mass of the support device is arranged underneath a base plate;

FIG. 4 is a sectional view of an embodiment of the invention in which the mass of the support device is arranged within the support device is arranged within the base part of a microphone tripod;

DESCRIPTION OF THE PREFERRED EMBODIMENT

Figure 1:
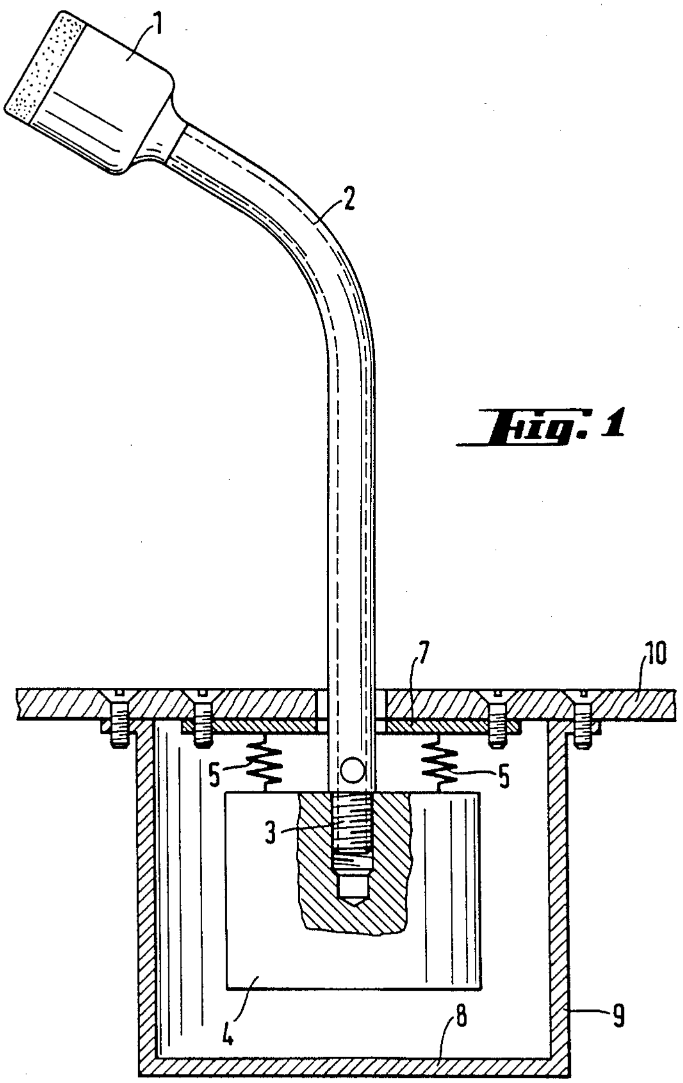
FIG. 1 is a schematic sectional view of a support device according to the present invention.

The resiliently fastened support device according to the present invention for an arrangement carrying a microphone is schematically illustrated in FIG. 1 of the drawings. The end of a gooseneck 2 or tripod tube facing away from the microphone 1 is connected by means of a thread 3 to the support device 4.

The support device 4 is of a metal having a high specific gravity, such as, iron, brass, lead or the like. Accordingly, the mass of the support 4 can be greater by a multiple than the mass of the microphone 1 and the arrangement 2 carrying the microphone 1 particularly when the latter parts are made of plastics material.

The support device 4 is resiliently mounted either suspended by means of springs 5, as shown in FIG. 1 or supported by means of a spring 6, as shown in FIG. The springs 5, 6 are either mounted on an assembly plate 7 or are fastened to a bottom part 8 of an outer container 9. To prevent the support device 4 including the arrangement 2 carrying the microphone 1 from carrying out any wobbling movements, the support device advantageously is laterally guided. A base plate receiving the entire arrangement or a cover plate of a stand space or part of a tripod space is provided with reference numeral 10. Instead of the threaded connection 3, it is also possible to provide a connection without thread on the basis of a press fit or by means of an adhesive. The arrangement 2 which is rigidly connected to the support device 4 and carries the microphone 1 may also be just a piece of pipe or a part having any shape. At the end facing the microphone 1, the arrangement 2 may have a multiple-pole plug, so that the microphone 1 can be disconnected and easily replaced.

Figure 2:
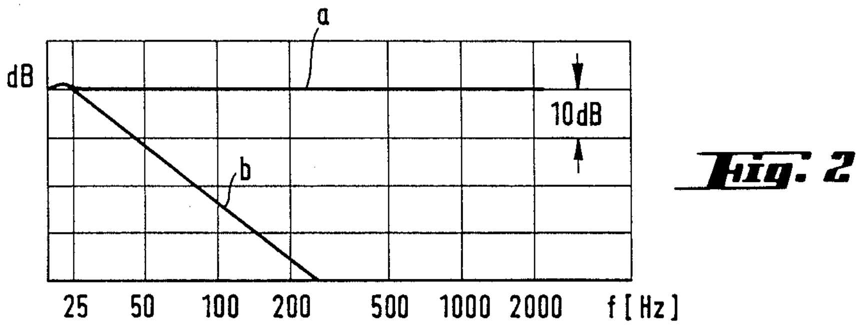
FIG. 2 shows the stamping pattern of the device according to the invention in dependence on the frequency.

Because of the great mass of the support device 4 of the arrangement according to the present invention, the arrangement has a low resonance frequency which is at the lowest end or below the transmission range of the microphone. As a result, the mechanical vibration insulation is particularly effective. FIG. 2 shows in curve b the effect of the resiliently mounted support device for damping mechanical vibrations, compared to a reference value illustrated in curve a which results in an arrangement without the feature according to the present invention when mechanical vibrations act directly o the microphone.

FIG. 3 of the drawing shows an embodiment of the present invention in which the support device is mounted underneath a base plate 10. In the simplest case, the support device 11 is a cylindrical component which is mounted in an outer container 12. The support device is resiliently mounted by means of a spring 13 which rests against a base plate 14 which can be placed or screwed into the container 12. Lateral guide members 15 ensure that the cylindrical support device 11 can only move in axial direction. The guide members 15 may be rings, rollers, balls or the like of elastic or inelastic material. As a result, a wobbling movement of the entire arrangement is avoided and it is only necessary to resiliently absorb axially directed force components resulting from an impact.

The spring 13 may be of optional design, such as, a helical spring or a cup spring or also an elastically deformable and simultaneously damping rubber part. It must only be ensured that the spring proper or the fastened ends thereof have a mechanical vibration-insulating property, so that no sound-conducting bridges are formed. The same is true for the lateral guide 15. Threaded pin 16 is provided for fastening the tripod tube, the gooseneck or another arrangement carrying the microphone. A bore 17 may be provided for guiding the microphone cable therethrough.

FIG. 4 of the drawing shows another embodiment of the invention in which the mass of the support device is arranged within the base part of a microphone tripod. The base part 18 of a microphone tripod is generally bell-shaped. The joints 22 of the swivelable tripod legs 19 as well as the tripod tube 20 are fastened in the base part 18. In accordance with the present invention, the support device 21 carrying the tripod 2 has a mass which is resiliently fastened, for example, through an elastic rubber disk 23 to the base plate 24 of the base part. In order to best utilize the space available for the support device 21 within the base part 18, the device 21 also is bellshaped. However, a different shape is also possible, for example, a truncated cone or cylinder. Also in this embodiment, lateral guide members 25 of the above-described type are provided in order to prevent wobbling movements of the support device 21. The tripod tube 20 is connected to the support device 21 by of a glued connection 33, a press fit or a threaded connection.

Figure 5:
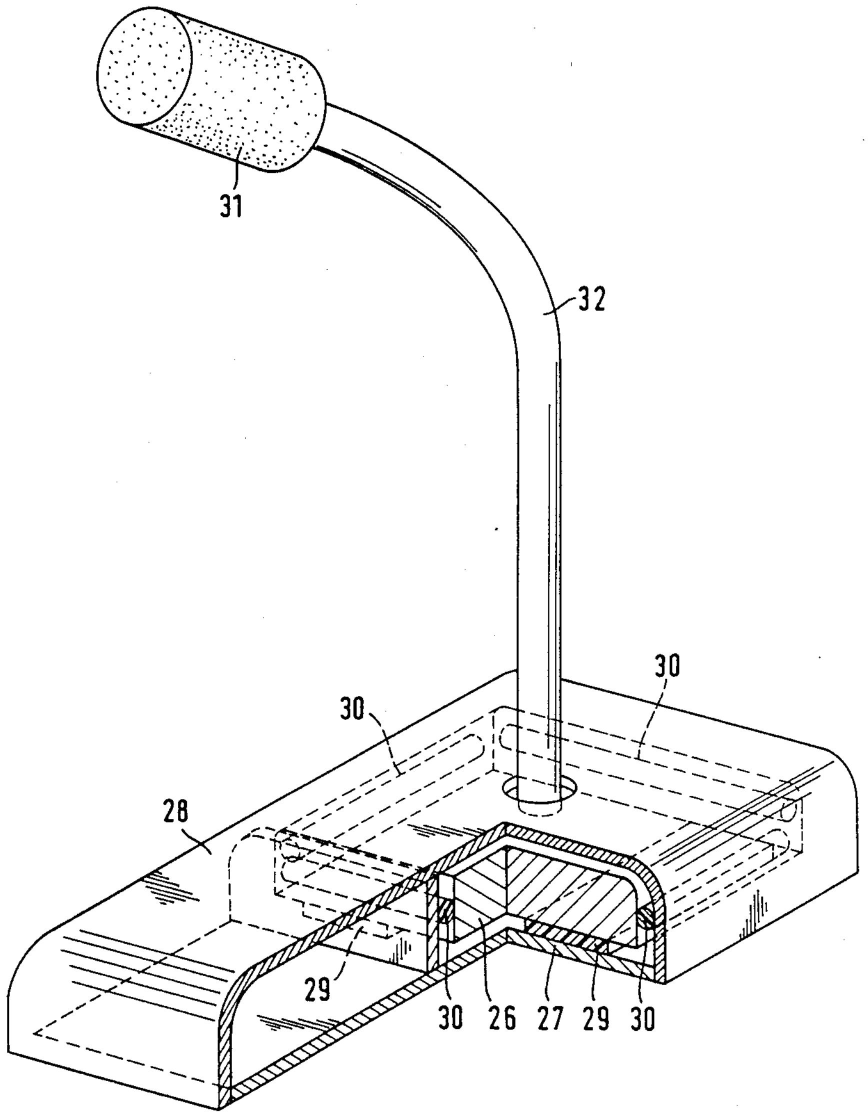
FIG. 5 is a perspective view of another embodiment of the invention in which the mass of the support device is arranged within the space of a microphone table stand.
Figure 6:
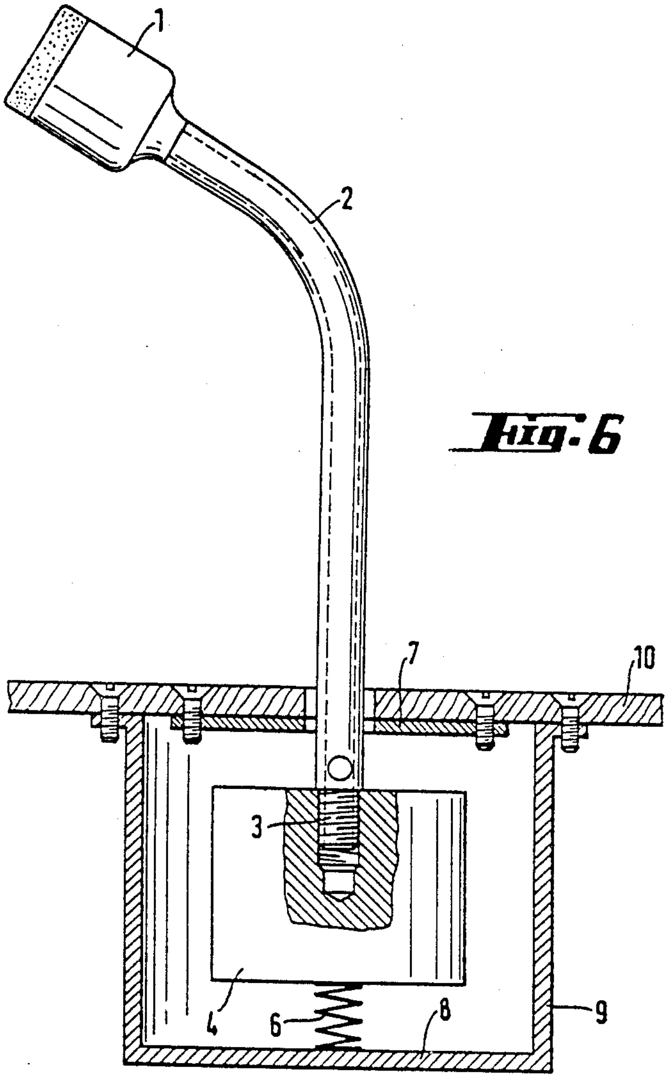
FIG. 6 is a view similar to FIG. 1 in which the support device is supported differently.

In the embodiment of the present invention shown in FIG. 5 of the drawing, the mass the support device is arranged within the base of a microphone table stand. The support device 26 forming a solid mass is resiliently fastened at the base plate 27 of the table stand base 28 by means of elastic rubber strips 29. Movement of the support device 26 parallel to the base plate 27 is prevented by lateral guide members 30. The gooseneck 32 carrying the microphone 31 is rigidly connected to the support device 26.

While specific embodiments of the invention have been shown and described in detail to illustrate the application of the inventive principles, it will be understood that the invention may be embodied otherwise without departing from such principles.

I claim:

1. In a resiliently fastened support device for supporting an arrangement carrying a microphone, wherein the support device is connected to an end of the arrangement which faces away from the microphone and the microphone is mounted on the other end of the arrangement, wherein the improvement comprises that the support device has a mass which is a multiple of the mass of the microphone and the arrangement carrying the microphone.

2. The support device according to claim 1, wherein the arrangement carrying the microphone is a tripod tube.

3. The support device according to claim 1, wherein the arrangement carrying the microphone is a gooseneck.

4. The support device according to claim 1, wherein the arrangement carrying the microphone is a plug-type connection.

5. The support device according to claim 1, wherein the mass of the support device is arranged below a base plate.

6. The support device according to claim 5, wherein the base plate is part of a lectern.

7. The support device according to claim 5, wherein the base plate is part of a table.

8. The support device according to claim 5, wherein the base plate is part of a switchboard.

9. The support device according to claim 1, wherein the mass of the support device is mounted within a base part of a microphone tripod.

10. The support device according to claim 1, wherein the mass of the support device is arranged within a base of a microphone table stand.

* * * * *